R. M. MELTON.

Cultivator.

No. 6,379. Reissued April 13, 1875.

Witnesses.
R. G. Stuart.
W. B. Richards.

Inventor:
Reuben M. Melton
(by) A. McCallum
Atty

THE GRAPHIC CO. PHOTO-LITH. 39 & 41 PARK PLACE, N.Y.

UNITED STATES PATENT OFFICE.

REUBEN M. MELTON, OF CRIGLERSVILLE, VIRGINIA.

IMPROVEMENT IN CULTIVATORS.

Specification forming part of Letters Patent No. 24,227, dated May 31, 1859; reissue No. 4,875, dated April 16, 1872; extended seven years; reissue No. 6,379, dated April 13, 1875; application filed January 4, 1875.

*To all whom it may concern:*

Be it known that I, REUBEN M. MELTON, of Criglersville, in the county of Madison and State of Virginia, have invented certain Improvements in Cultivators or Shovel-Plows, of which the following is a specification:

My invention relates to improvements in shovel-plows or cultivators, in which two or more shovels or plows are connected with the same frame.

The object of the improvements is to facilitate the adjustment of the distance between the plows, and to regulate the pitch of the points of the shovels or plows by raising or lowering on the curve of the beam.

The invention by which these objects are accomplished consists in connecting the beams of the sides with a central beam, by means of adjustable link connections with adjustable slides on the beams, whereby a greater range of motion may be given to the beams with short links. It also consists in making the plows or shovels of such form and with such means of attachment as permit of their being adjusted by sliding them up or down the curves of the beams or standards, thereby changing the inclination or pitch of the points, so as to increase or decrease the downward draft of the plows, and to run at different depths, as desired, while at the same time the backs are supported by the plow-beams, which thereby prevent them from springing when subjected to heavy strains. It further consists in providing a cutter or colter of peculiar form, attachable to the curved beams, and adjustable thereon for the purpose hereinafter more fully set forth.

Figure 1:
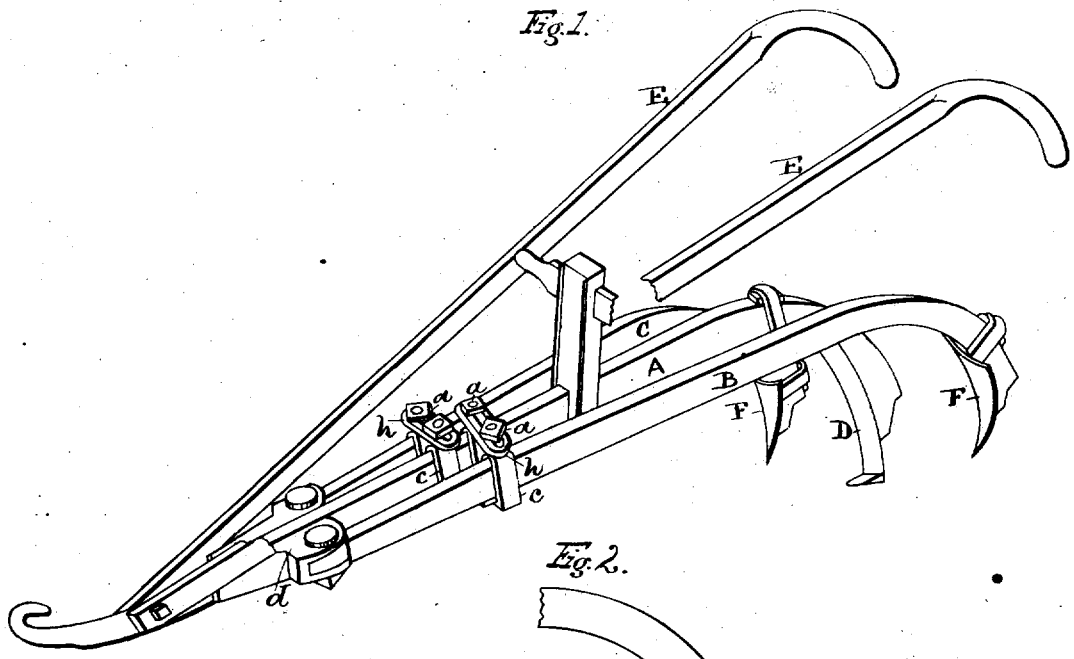
Figure 2:
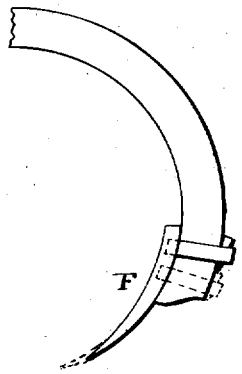

In the accompanying drawings, Figure 1 is a perspective view of a cultivator or shovel-plow embodying my improvements. Fig. 2 is a side elevation of one of the curved plow-beams, showing the method of adjusting the shovels or plows.

In Fig. 1 is represented a shovel plow or cultivator, consisting of a series of plows or shovels arranged on separate beams—a central beam, A, and two side beams, B and C—which are connected to the center by a joint-piece, *d*, that admits of their moving laterally to vary the distance between the plows. These beams are rectangular bars of iron of different lengths, and are curved downward at their rear ends, for the purpose hereinafter set forth. The side beams are connected with and adjusted to the center beam by means of adjustable links *h*, which pass over the heads of adjustable slides *c*, and are confined thereto by a nut, *a*, that screws down on the head of the slide and prevents the beam from moving. The slides are keyed to the under side of the beam, and can be moved thereon nearer to or farther from the center of motion of the side beams, which admits of the beams having a great range of motion laterally with the use of short connecting-links. The plow-beams are curved downward at their rear ends, so as to form standards, on which the plows F can be adjusted and secured at any point up or down the curve. Any of the well-known forms of shovels may be used with these curved beams. The plow or shovel is attached to the standard or curved portion of the beam by means of a sleeve secured or riveted to its back, which is of proper size to fit the beams, and secured thereto by a key, so that the shovel can be adjusted up or down the curve of the beam to the required height for the depth of the furrow. By this means the shovels can be made to run deep or shallow, or at different depth, as desired.

D represents a cutter or colter of peculiar form, shown in Fig. 1 as attached to the center beam. It may, however, be attached to either of the beams in the same manner as the plows F. It is also, like the shovels, so formed, in connection with the curve of the beam, that, by sliding it up or down, it is raised or depressed, so as to increase or lessen its draft or depth of penetration, and, at the same time, the back of the colter is supported through a great portion of its length by the plow-beam, thereby increasing its capacity to resist heavy draft upon it in passing through compact soil, or when its passage is resisted by strong, tough roots, for which purpose, and for cutting the roots of weeds in the early stages of cultivation, this cutter is peculiarly adapted. When plowing very shallow furrows this colter attachment may also be of great benefit in steadying the plows and preventing them from being thrown out of the ground. E E are plow-handles, secured to the beams.

What I claim as my invention is—

1. The adjustable links *h* and adjustable slides *c*, constructed substantially as described, and arranged to operate with, and for the purpose of adjusting the distance between, the plow-beams, as set forth.

2. The shovels F, freely adjustable to any point up or down on the curved beams, so as to run deep or shallow or at different depths, as set forth.

3. The colter attachment D, constructed substantially as described, and adjustable up or down the curved beams, for the purpose specified.

4. The colter attachment D and shovels F, operating in combination with the curved beams, substantially as and for the purpose specified.

Witnesses: R. M. MELTON.

WILLIAM BENTHEL JENKINS,

G. W. MELTON.